Oct. 2, 1956　　　C. G. GRIFFITH　　　2,765,394
METHOD AND MACHINE FOR CUTTING METAL
Filed Feb. 14, 1955　　　2 Sheets-Sheet 1
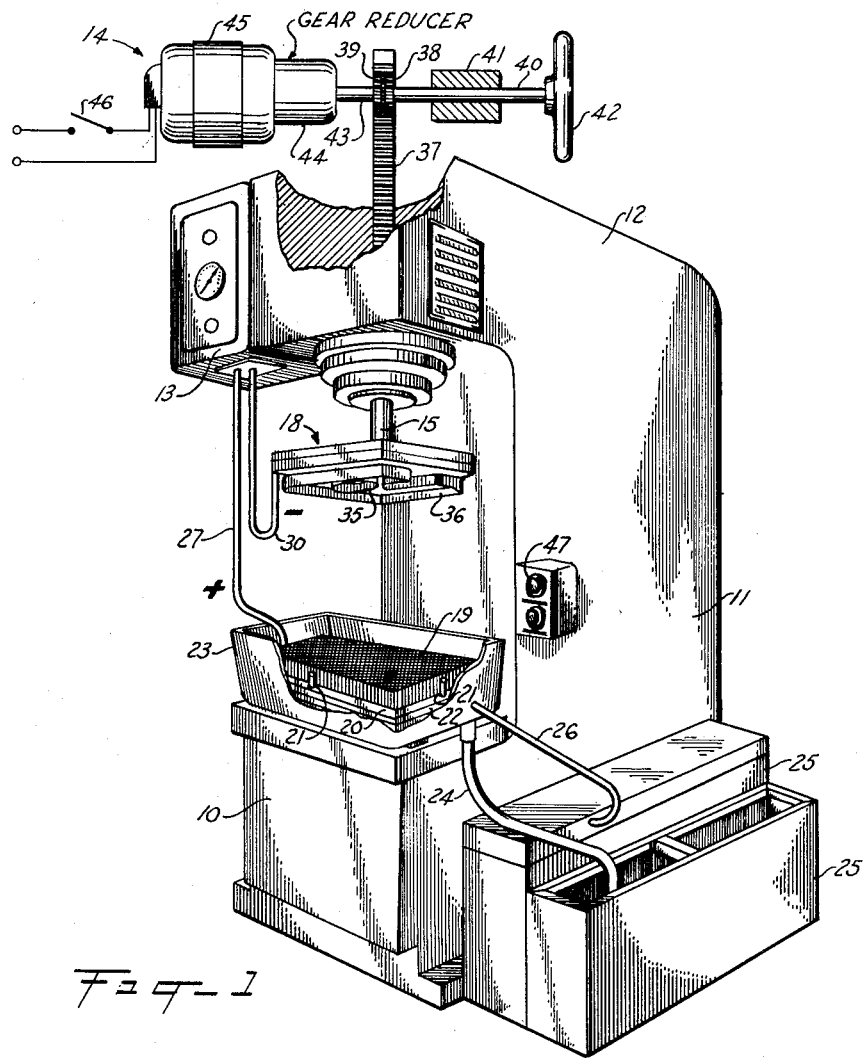
Fig. 1
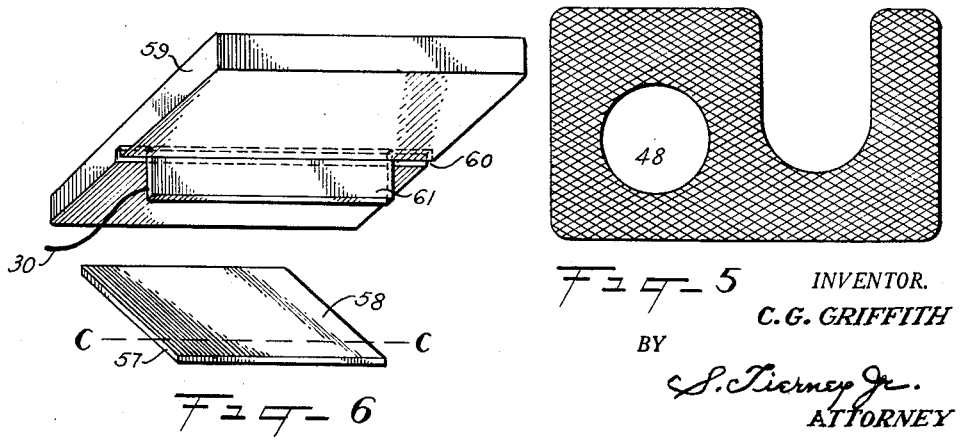
Fig. 5
Fig. 6
INVENTOR.
C. G. GRIFFITH
BY
S. Tierney Jr.
ATTORNEY INVENTOR.
C. G. GRIFFITH
BY S. Tierney Jr.
ATTORNEY United States Patent Office 2,765,394
Patented Oct. 2, 1956

2,765,394

METHOD AND MACHINE FOR CUTTING METAL

Charles G. Griffith, San Diego, Calif., assignor to Rohr Aircraft Corporation, Chula Vista, Calif., a corporation of California Application February 14, 1955, Serial No. 487,764

11 Claims. (Cl. 219—69)

This invention relates to a machine and method for machining a workpiece which is difficult or impossible to cut by any of the usual cutting tools to a desired shape.

When a workpiece is cut from a thin sheet of titanium, for example, by a saw or shear, it is found that many small cracks extend from the cut edge into the body of the workpiece for a substantial distance thus weakening the workpiece and detracting from its appearance. It is an object of my invention to cut a workpiece from a titanium or other metal sheet by means of a high frequency electrical discharge which does not form such cracks or otherwise injure the workpiece. According to the invention the electrical discharge vaporizes the metal which is removed and the vaporized metal is continually carried away by a cool dielectric fluid which prevents any appreciable temperature rise in the workpiece. Since the electrical discharge does not set up internal stresses in the metal and since there is no substantial change in its temperature, the grain structure of the metal is unaffected by the machining operation with the result that the physical properties of the severed workpiece are substantially the same as those of the original sheet.

When a panel of desired contour is cut from a large piece of honeycomb composed of thin sheet metal by known methods, it has been found necessary to fill the honeycomb cells with a material which is rigid at room temperature in order to prevent the cell material near the cutting tool from bending and thus not being machined to the proper contour. It is an object of my invention to obviate the necessity of filling the honeycomb with any supporting material prior to the machining thereof.

A further object of the invention is to provide a novel form of electrode for use in a machine for disintegrating metal by electrical discharge. In the preferred embodiment of the invention, the electrode consists of a thin flexible metal strip which is bent to the shape of the desired workpiece.

A still further object is to provide means for supporting the flexible electrode by the marginal edges of two rigid members spaced a small distance apart, said marginal edges engaging the opposite faces of the electrode and maintaining the bottom edge of the electrode in a plane.

Another object is to provide means for adjusting the flexible electrode in its support so that as the bottom portion of the electrode is slowly consumed by the electrical discharge, the operator can easily lower the electrode in its support to compensate for the loss.

A further object is to provide means whereby an electrode of the type described can be made of inexpensive materials available on the market in all parts of the United States and wherein the electrode can be readily attached to the vertically reciprocating plunger of a punch, forming or other known type of press.

Further objects will become apparent as the description of the machine proceeds. For a better understanding of the invention reference is made to the accompanying drawing, in which:

Fig. 1 is a view partly in perspective and partly schematic of a machine embodying the invention;

Fig. 5 is a top view of a honeycomb panel cut by the machine of Fig. 1 and,

Fig. 6 is a perspective view showing a modified form of electrode and a flat metal sheet to be severed.

Figure 2:
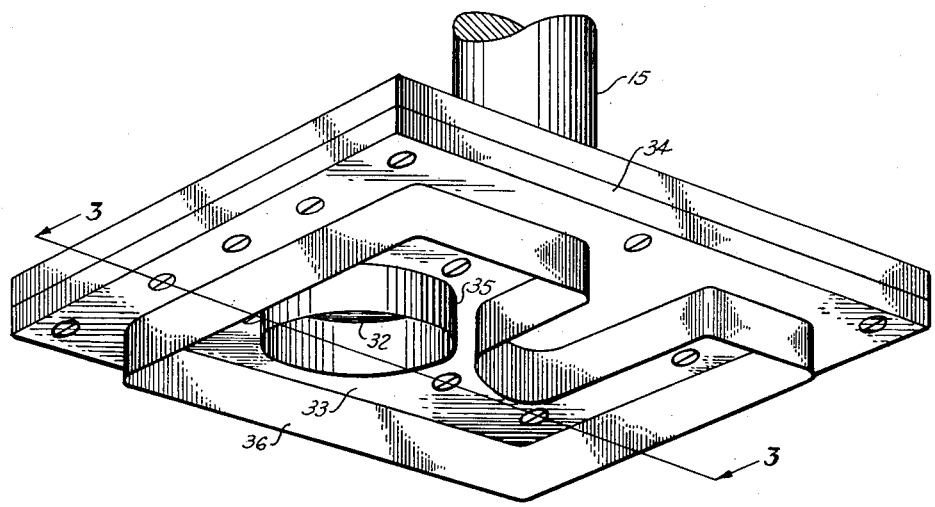
Fig. 2 is a perspective view on an enlarged scale showing the electrode construction of the machine of Fig. 1.
Figure 3:
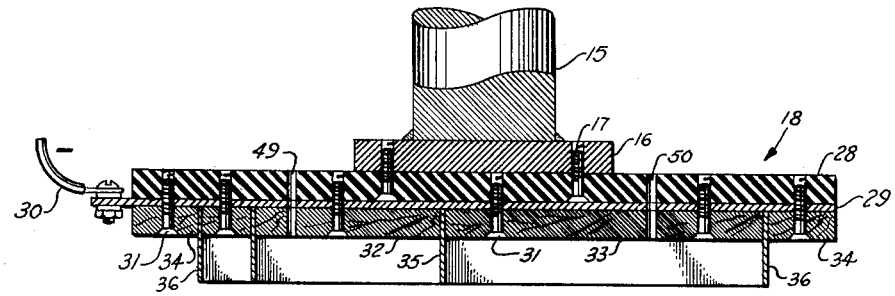
Fig. 3 is a sectional view substantially on line 3—3 of Fig. 2.

The invention is illustrated by an electrical machine having a supporting base 10 having a hollow vertical casing 11 the top portion 12 of which contains a source 13 of high frequency unidirectional electrical current impulses and drive means 14 for vertically raising and lowering a guided cylindrical rod 15. Rod 15 has attached thereto a plate 16 of insulation material (see Fig. 3) to which is attached by screws 17 an electrode structure 18 adapted to sever a metal panel 19 supported on the flat top face of a metal plate 20. Panel 19 is illustrated in Figs. 1 and 5 as composed of thin metal sheets connected together in a known manner to form honeycomb cells with vertical cell walls. The honeycomb may be made of stainless steel, aluminum or other known metal. Plate 20 is provided with two or more projecting locating pins 21 against which the peripheral wall of panel 19 is placed to correctly locate the panel on plate 20. Plate 20 rests on a second metal plate 22 which in turn rests on the bottom of a deep pan 23 adapted to contain coolant liquid to a level slightly above the top of panel 19. The liquid is supplied through a hose 24 connected to a pump (not shown) in tank 25 which forces liquid contained in the tank and after circulating over the panel 19 the liquid is returned to the supply source by a hose 26 so that a steady flow is maintained over the panel which is not heated up by the high frequency electrical discharges. Plate 22 may be copper and is connected by a conductor 27 to the positive terminal of current source 13.

Electrode structure 18 (see Fig. 3) comprises a panel 28 of a hard plastic such as Bakelite against the bottom face of which is seated a thin metal sheet 29, such as copper, which is a good current conductor. Sheet 29 is connected by conductor 30 to the negative terminal of current source 13. Attached by a plurality of screws 31 to panel 28 are three plates 32, 33, 34 of insulating material which may be readily cut to any desired shape by a thin band saw. The plates shown are made of plywood but may be of Masonite, phenolic plastic or any inexpensive insulating material which is rigid and may be easily cut to size. The space between plates 32 and 33 snugly receives the upper portion of a thin flexible metal strip 35 which has been bent to the circular shape shown and the space between plates 33 and 34 snugly receives the upper portion of a thin flexible metal strip 36 bent to the shape shown. Strips 35, 36 are preferably made of brass or other good electrical conductor of a thickness of about .020 inch, their bottom edges, in the illustration shown, lying in a horizontal plane. The three plates 32, 33 and 34 are preferably cut from a single rectangular piece of plywood whose outside dimensions are those of panel 28 by cutting through the piece by a bandsaw whose blade is of such thickness that when the three cut pieces are assembled together, the electrode strips 35 and 36 will fit snugly between the pieces and remain in the position shown in Fig. 3. The invention thus provides an inexpensive manner of constructing an electrode capable of cutting metal by means of electrical discharges of radio frequency.

Referring to Fig. 1, the drive means 14 comprises a toothed rack 37 cut on the upper end of rod 15, and a pair of pinions 38, 39 whose teeth engage the rack teeth. Pinion 38 is mounted on a shaft 40 journaled in a bearing 41, a hand wheel 42 being secured to the end of the shaft. Pinion 39 is secured to shaft 43 driven by a gear reducer 44 connected to the shaft of an electric motor 45. Current is supplied to motor 45 through an on-off switch 46 which is operated by a push button 47 mounted on casing 11 at a height convenient to the operator.

To cut a honeycomb part of the shape shown in Fig. 5 having a circular hole 48 extending therethrough, the operator places a rectangular panel 19 with the cell walls extending vertically on plate 20 with the edges of the panel touching locating pins 21. Hand wheel 42 is then rotated to lower rack 37 and strips 35, 36 until the lower portions of the strips are in the coolant fluid. Button 47 is then pressed to close switch 46 and start motor 45 which slowly brings the lower edges of strips 35, 36 within arcing distance of panel 19. The unidirectional current discharges heat molecules at the top of the panel to the point of vaporization. These have a positive charge and are attracted toward the negative strips. As the detached molecules pass up, they are carried away by the circulating coolant liquid. This process continues, the lower portions of the strips moving down in the narrow channels made in the panel by the detachment of the molecules. These channels have a width only slightly greater than the thickness of strips 35—36 so that when the strips have penetrated clear through the panel, a peripheral strip has been severed from its edge leaving a finished workpiece having a peripheral edge of desired shape, as shown in Fig. 5. Also a circular piece has been cut out of the panel leaving a hole 48 extending therethrough. Button 47 is now pushed to open switch 46 and stop motor 45, whereupon hand wheel 42 is rotated to raise electrode structure 18 to its initial position, shown in Fig. 1. After removing the honeycomb parts from the machine, other panels may be severed in the manner described. The metal string 35—36 are gradually consumed and when they no longer extend below plate 33 a sufficient distance, they are removed and replaced by new strips. Although strips 35—36 have been illustrated as bent to the shapes shown, it will be understood that they may be bent to many other shapes, the slots in the wood plates 32, 33 and 34 which receive them being shaped to correspond. Two holes 49, 50 are shown extending through the electrode support to permit air to escape from the pockets formed by strips 35—36 as the strips are lowered in the coolant liquid.

In event it is not desired to cut the hole 48 entirely through panel 19 but to cut a recess only part way through it, circular strip 35 is placed by a solid metal plug (not shown) which extends down below the bottom face of plate 34 by the desired amount. This metal plug may be of circular, polygonal or other desired cross sectional shape.

Figure 4:
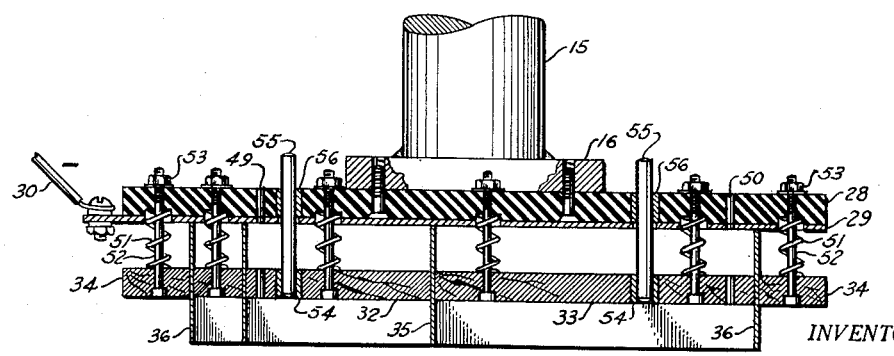
Fig. 4 is a sectional view of a modified form of electrode construction.

Fig. 4 shows a modified form of electrode structure for supporting and protecting the lower portions of the thin brass strips 35—36 and to permit higher portions to be exposed as the lower edges of the strips become consumed by the electrical discharges. In this case plates 32, 33 and 34 are biased down by coiled compression springs 51 which surround bolts 52 having threaded nuts 53. To guide plates 32, 33 and 34 vertically and prevent any sidewise displacement thereof, the plates have secured thereto short tubes 54 which are attached to the lower ends of vertical cylindrical guides 55. The upper portions of guides 55 are slidable within guide bushings 56 which are anchored in panel 28. Only enough of the strips 35—36 is allowed to extend below plates 32, 33, 34 to pass completely through panel 19 and as the lower edges of the strips are consumed by the electric discharges, the nuts 53 are tightened to raise the plates 32, 33 and 34 to compensate for the loss, these plates sliding up along the strips 35—36.

Fig. 6 shows an electrode structure for severing the edge portion 57 from a flat sheet 58 of titanium along line c—c to provide a straight vertical edge on the sheet. The structure includes a flat plate 59 of plywood, Masonite or other insulating material, this plate being adapted to be secured to the bottom of panel 28 by a set of screws (not shown). A straight vertical slot 60 is cut in plate 59 to snugly receive a thin flexible strip 61 of brass whose length is somewhat greater than the length of cut c—c.

The titanium sheet 58 is placed on plate 20 (Fig. 1), conductor 30 connected to strip 61 and the machine operated in the manner above described. As the bottom edge of strip 61 approaches closely to sheet 58, electrical discharges of radio frequency cause titanium molecules along line c—c to be vaporized and carried away by the coolant liquid. As strip 61 is slowly lowered, it cuts a progressively deeper straight groove in sheet 58 until its edge portion is severed. Since coolant fluid is flowing over sheet 58, its temperature is not raised and since no internal stress is set up in the sheet due to the pressure of a cutting tool, the molecular structure of its metal is not changed. The cut edge of sheet 58 is thus straight and free from cracks or other imperfections.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. Means comprising an electrode adapted to transmit high frequency electrical discharges to a metal workpiece disposed under the bottom edge of the electrode to disintegrate by high frequency electrical discharges a narrow portion of the workpiece, said electrode comprising a long thin strip of flexible metal whose thickness is substantially less than its width; and a member composed of dielectric material for supporting said electrode, said member having spaced apart vertical walls in engagement with only portions of the opposite faces of said strip to leave the lower portion of the strip freely exposed and permit the bottom edge of the strip to be lowered within arcing distance of the workpiece, a thin metal plate attached to the upper end of said supporting member, the lower face of said plate resting on the top edge of said metal strip; and an energized conductor connected to said plate to supply high frequency electrical impulses thereto.

2. An electrode adapted to transmit high frequency electrical discharges to a metal workpiece disposed under the bottom edge of the electrode to disintegrate a narrow portion of the workpiece, said electrode comprising a long thin strip of flexible metal whose thickness is substantially less than its width and means for supporting said electrode, said means comprising a plate of insulation material having a curved vertical peripheral wall in engagement with a portion of the outer face of said strip; and a second plate of insulation material having a curved vertical peripheral wall in engagement with a portion of the inner face of said strip, the bottom portion of the strip extending below both said plates to permit the bottom edge of the strip to be lowered within arcing distance of the workpiece.

3. Means for simultaneously severing the edge portion of a metal workpiece and making an opening through the workpiece comprising, in combination: a support composed of insulation material; a long thin strip of flexible metal whose thickness is substantially less than its width, the upper portion only of said strip being anchored in said support in a manner to maintain the faces of said strip substantially vertical and with the inner face of the strip disposed along a curve having the same shape as the outer peripheral wall of the desired workpiece; a second thin strip of metal whose thickness is substantially less than its width, the faces of said second strip being substantially vertical and the upper portion of said second strip being anchored in said support in a manner to maintain the outer face of said second strip disposed along a curve having the same shape as the marginal wall of said opening; a vertically movable plunger connected to said support and arranged to slowly lower said strips and advance the bottom edges thereof close to the workpiece; and a current source connected to said strips to supply unidirectional high frequency current impulses thereto.

4. Means for electrically severing the edge portion of a metal member to leave a metal panel having a peripheral wall of desired contour and for also forming a recess in the top of the panel comprising, in combination: a substantially horizontal insulation support having a slot of the desired contour terminating in its lower face; a strip of flexible metal having its upper portion only extending into and substantially filling said slot, the thickness of said strip being substantially less than its width; a conductor attached to and depending from said support at a region within and spaced from said slot, said conductor having a bottom face disposed at a level substantially above the bottom edge of said strip; means for slowly lowering said support; and means for simultaneously transmitting high frequency current impulses to said strip and conductor.

5. The method of severing from one end of a cool sheet of titanium an end portion to leave a cool workpiece having an end face of desired contour which comprises the steps of placing the sheet on the top face of an electrical conductor; covering the sheet and said conductor with a coolant fluid; slowly advancing a thin metal electrode down toward the end of the sheet with the lower edge of the electrode leading, the thickness of said electrode being substantially less than its width and the lower edge of the electrode being shaped to the desired contour; simultaneously applying electrical current impulses to said electrode while the lower edge thereof advances through the coolant liquid and the end of the sheet to the bottom face of said sheet.

6. The method of severing the edge portion from a metal honeycomb structure to leave a honeycomb panel whose peripheral wall has a predetermined contour which comprises the steps of providing an electrical conductor with a flat face of large area; placing the honeycomb structure on said flat face with the walls of the cells disposed vertically; covering said conductor and honeycomb structure with coolant liquid; bending a thin metal strip to said predetermined contour, the thickness of said strip being substantially less than its width; supporting the bent strip with its lower edge spaced from but within arcing distance of the honeycomb structure; slowly advancing said strip down through the honeycomb structure and simultaneously applying high frequency unidirectional current impulses to the strip until said edge portion is severed.

7. The method of severing the edge portion from a metal honeycomb structure to leave a honeycomb panel whose peripheral wall has a predetermined contour and for simultaneously forming a recess in the top of the panel comprising the steps of providing an electrical conductor with an upper face of large area; placing the honeycomb structure on said upper face with the walls of the cells disposed vertically; covering said honeycomb structure with coolant liquid; bending a thin metal strip to the predetermined contour, the thickness of said strip being substantially less than its width; attaching said strip to a vertically movable support so that the faces of the strip are vertical; attaching a conductor having a horizontal bottom face to said support at a position within said strip with said bottom face at a level substantially above the bottom edge of the strip; slowly lowering said support to advance the strip down through the honeycomb structure and the bottom face of said conductor partially through the structure while simultaneously applying high frequency unidirectional current impulses to said strip and conductor.

8. Means for severing the edge portion of a metal workpiece comprising, in combination: a horizontal support; a plate of insulation material under and spaced from said support, said plate having a long continuous slot therein with spaced apart vertical marginal walls; a long thin metallic strip whose thickness is small in comparison with its width extending up through said slot into contact with said support; a plurality of spaced apart adjustable fasteners connecting said plate to said support, said fasteners being constructed to raise said plate toward said support to cause the lower edge of said strip to project below said plate by any desired distance; and a conductor connected to said strip to supply high frequency unidirectional current impulses thereto.

9. Severing means as claimed in claim 8, in which said conductor comprises a thin metal plate against which the top edge of said strip abuts.

10. Severing means as claimed in claim 8, in which a plurality of spaced apart guide pins depend from said support; and said plate is provided with a plurality of openings having vertical marginal walls in contact with and slidable along said guide pins.

11. Severing means as claimed in claim 8, in which a plurality of spaced apart springs are arranged to continually bias said plate away from said support.

References Cited in the file of this patent

UNITED STATES PATENTS

| 2,427,588 | Burnett | Sept. 16, 1947 |
| 2,666,123 | Blackman | Jan. 12, 1954 |

FOREIGN PATENTS

| 637,793 | Great Britain | May 24, 1950 |